United States Patent
Brewka

(10) Patent No.: US 7,131,808 B2
(45) Date of Patent: Nov. 7, 2006

(54) RETAINING WEDGE FOR CONCRETE FORMS

(75) Inventor: Roman Brewka, St. Joseph, MO (US)

(73) Assignee: Western Forms, Inc., Kansas City, MO (US)

( * ) Notice: Subject to any disclaimer, the term of this patent is extended or adjusted under 35 U.S.C. 154(b) by 0 days.

(21) Appl. No.: 11/034,786

(22) Filed: Jan. 13, 2005

(65) Prior Publication Data

US 2006/0153663 A1    Jul. 13, 2006

(51) Int. Cl.
*F16B 19/00*    (2006.01)
(52) U.S. Cl. ........................ 411/355; 249/196
(58) Field of Classification Search ................ 411/513, 411/351, 354, 355; 249/191, 196, 44–46
See application file for complete search history.

(56) References Cited

U.S. PATENT DOCUMENTS

| | | | | |
|---|---|---|---|---|
| 556,836 A | * | 3/1896 | Tyzick | 238/252 |
| 1,029,658 A | * | 6/1912 | Argabright | 238/290 |
| 1,250,003 A | * | 12/1917 | Phenicie | 403/396 |
| 1,452,777 A | * | 4/1923 | Band | 411/354 |
| 1,563,518 A | * | 12/1925 | Northey | 411/355 |
| 2,140,772 A | * | 12/1938 | Games et al. | 52/580 |
| 2,941,437 A | * | 6/1960 | Brander | 411/355 |
| 4,508,479 A | * | 4/1985 | Mez | 411/340 |
| 6,655,650 B1 | | 12/2003 | Ward | |
| 6,666,428 B1 | | 12/2003 | Ward | |
| 6,698,709 B1 | | 3/2004 | Ward et al. | |

OTHER PUBLICATIONS

Western Forms, Inc. Catalog titled "World's Leading Innovator in Aluminum Forming Systems" copyright 1999 (Front page,; p. 24 back page).
Western Forms, Inc. Catalog titled "Concrete Forming Accessories 2nd Edition" copyright (Front page, p. 15, back page).

\* cited by examiner

*Primary Examiner*—Flemming Saether
(74) *Attorney, Agent, or Firm*—Hovey Williams LLP

(57) ABSTRACT

A retaining wedge for concrete forms has a tapered body of generally trapezoidal or triangular configuration. Oppositely diverging side edges of the body are provided with alternating peaks and valleys so as to present a number of detent-like depressions that encourage a firm and secure gripping action when the wedge is driven into the retaining slot of a locking pin that interconnects a pair of adjacent form panels. The peaks and valleys along each edge are presented by alternating convex and concave intersections between successive edge portions that slope outwardly at different angles from one another. Although certain portions of the edge slope outwardly at a higher angle than others, no edge portions slope inwardly toward the longitudinal axis of the wedge body. Consequently, the wedge is constantly tapering over its full length from one end to the other. A long, slender tip of the wedge facilitates insertion and fast starts.

23 Claims, 5 Drawing Sheets

RETAINING WEDGE FOR CONCRETE FORMS

TECHNICAL FIELD

This invention relates to the field of forming panels used in the creation of concrete walls and the like. More particularly, it relates to improvements in the hardware used to releasably fasten together adjacent panels of the form.

BACKGROUND AND SUMMARY

It is well known in the art to fasten together upstanding, adjacent forming panels using a locking pin that passes through aligned openings in the two panels and a retaining wedge that fits into a cross slot in the pin. The wedge bears against the end of the pin slot on the one hand and adjacent surfaces of the panel on the other and is usually driven tightly into place using a hammer or the like. Typically, the holes that receive the locking pins are formed in side rails on the panels that may be a variety of different thicknesses. Consequently, the pin slot may project through the holes to a greater or lesser extent, depending upon any given situation, which causes the dimensions of the slot that is exposed and available for receiving a wedge to vary accordingly. If a standard size wedge is used in all cases, in some instances only the tip of the wedge may be retained in the slot, while in others, the slot may be so big that the wedge actually passes completely through the slot or is retained only at its uppermost, widest portion. Generally speaking, it is desirable to have the wedge received approximately halfway into the slot so as to prevent accidental dislodgement due to vibrations and the like during handling and pouring operations.

In the past, in order to address the variable slot size problem, wedges have been provided in a number of different sizes. However, this requires the installer to keep a large inventory of different sizes on hand at all times. Moreover, selecting just the right size wedge for a particular situation from a large inventory of different sizes can be a nuisance. Typically, the wedges are provided in both flat and slightly curved models, which further exacerbates the problem.

Conventional wedges can also sometimes be difficult to insert into the retaining slots, particularly where the slots are small and the wedges must be used in tight spaces. Furthermore, conventional wedges sometimes spring into the air when they are driven out of their slots during stripping of the forms from the cured concrete, raising safety issues and increasing the risk of lost wedges.

The present invention provides a wedge that overcomes many of the shortcomings of the prior art. In a preferred form, the generally trapezoidal or triangular body of the wedge includes one or more depressions along at least one of its side edges that serves as a type of holding detent when the wedge is driven into place. Notwithstanding its secure holding action, the detent can be forcibly overcome during intentional removal of the wedge. Preferably, the wedge is provided with a more slender tip than conventional wedges so as to facilitate quick starting of the wedge when inserted into a slot and driven home. However, the remaining body of the wedge tapers outwardly at a fairly rapid rate so the wedge can be used with larger exposed slots, as well as narrow ones. This permits one size wedge to be used in a variety of different slot size situations, and eliminates the need to carry a variety of wedge sizes.

In a preferred embodiment, the depressions or detents are provided along opposite side edges of the wedge and are presented by alternating peaks and valleys. Notwithstanding the peaks and valleys, the side edges constantly diverge from one another, although at different rates depending upon the point along the body at which the divergence is examined. Each side edge has successive, intersecting edge portions that slope outwardly away from the longitudinal axis of the wedge at different angles. The higher sloped edge portions are all at the same slope angle, while the lower sloped edge portions are similarly all at a common slope angle. The side edge portions that present the slender tip of the wedge are at the lower slope angle, but such tip edge portions are substantially longer than similarly sloped edge portions in the remainder of the wedge to give the tip a pronounced extended effect. Preferably, the wedge is constructed from plate material and may either be presented in a flat or slightly curved configuration.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments.

Figure 1:
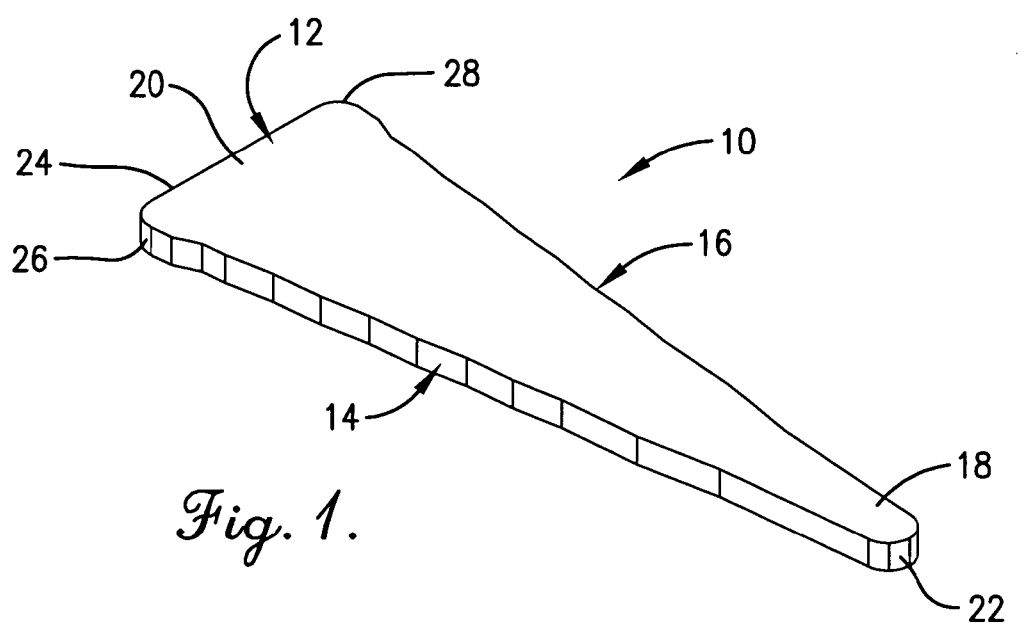
FIG. 1 is an isometric view of a wedge constructed in accordance with the principles of the present invention, the illustrated embodiment comprising a flat version of the wedge.
Figure 2:
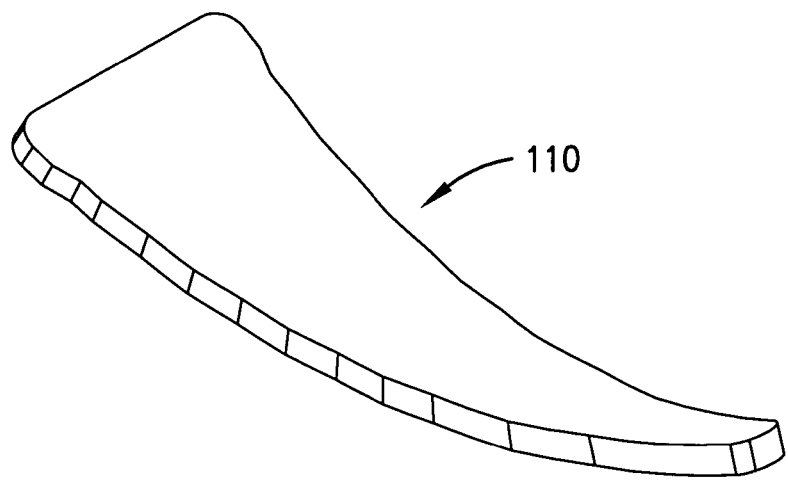
FIG. 2 is an isometric view of a curved embodiment of a wedge constructed in accordance with the principles of the present invention.

With initial reference to FIG. 1, the wedge 10 therein disclosed comprises a generally triangular or trapezoidal body 12 that is preferably constructed from flat, sheet steel material so as to present a constant thickness throughout its entire length and width. Body 12 presents a pair of opposite side edges 14 and 16 that mutually diverge from a tip 18 at one end of body 12 toward a head 20 at the opposite end thereof. Tip 18 has a rounded point 22, while head 20 has a straight, flat end 24 that is perpendicular to the longitudinal axis of body 12. Head 20 is enlarged across its width relative to the rest of the body 12 and has opposite rounded corners 26 and 28 that intersect with end edge 24 and side edges 14, 16. At least one of the edges 14, 16 and preferably both, is provided with at least one depression so as to facilitate gripping and retention of the wedge by an edge of a pin slot or the like during use thereof. The wedge 110 illustrated in FIG. 2 is identical to wedge 10, with the exception that wedge 10 is flat while wedge 110 is slightly curved.

Figure 3:
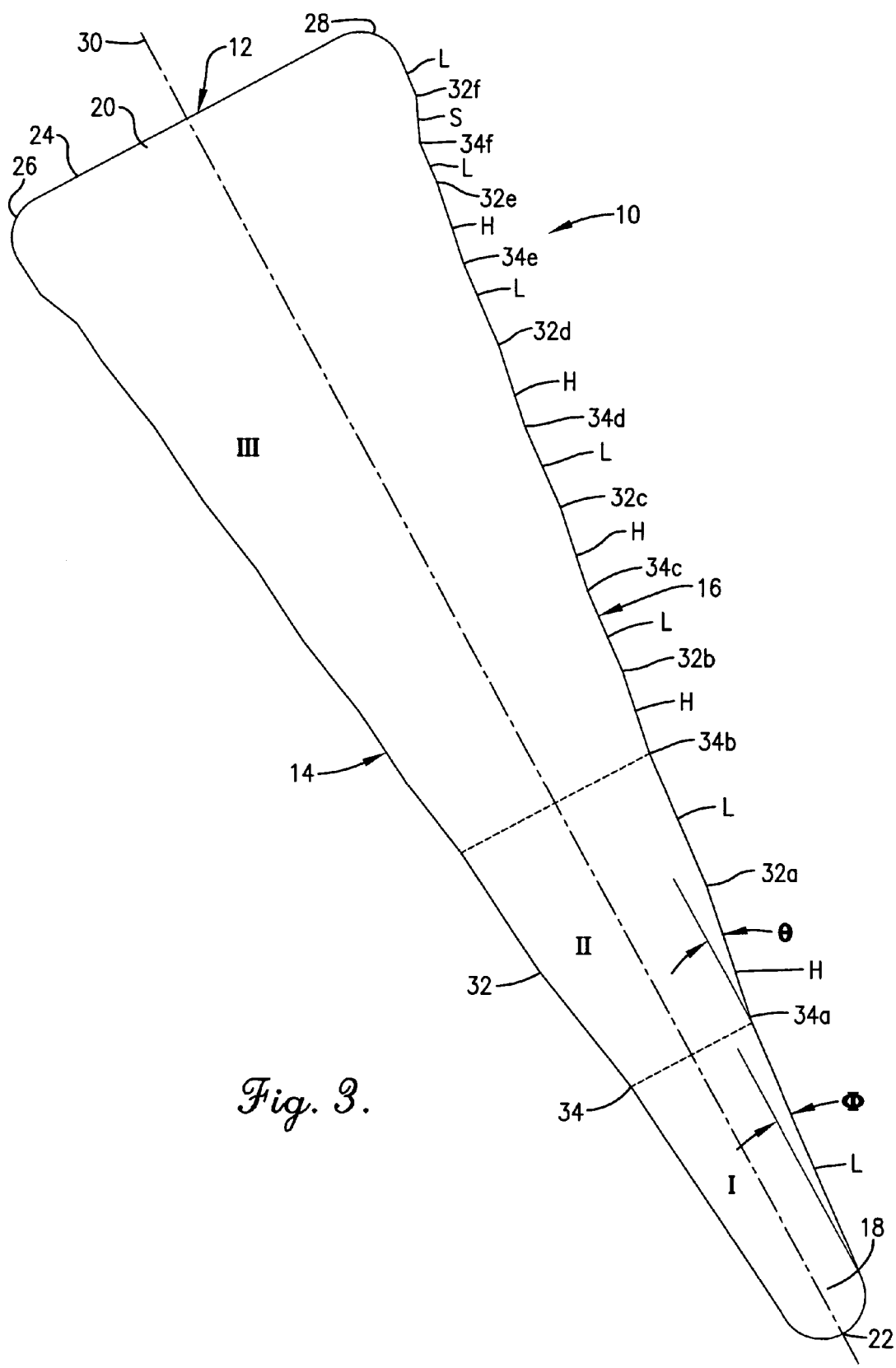
FIG. 3 is an enlarged top plan view of the flat embodiment illustrated in FIG. 1 to reveal details of construction of the wedge.

In order to illustrate details of construction of the wedges 10 and 110, the wedge 10 has been illustrated in plan in FIG. 3 on an enlarged basis, and details of construction will be set forth with respect to wedge 10, it being understood that such details of construction also apply to the wedge 110. Therefore, with reference in particular to FIG. 3, it will first be noted that wedge 10 is symmetrical about its longitudinal axis 30. At least one of the side edges 14, 16, and preferably both, is provided with a series of alternating peaks 32 and valleys 34 along its length. Beginning adjacent tip 18, the peaks 32 along edge 16 have been designated for clarity as peaks 32a, 32b, 32c, 32d, 32e and 32f. Correspondingly, the valleys 34 along edge 16 have been successively designated by the numerals 34a, 34b, 34c, 34d, 34e and 34f. The valleys 34 present the depressions in edges 14, 16 previously referred to.

Each edge 14,16 contains successive pairs of sloping edge portions that intersect in a convex relationship at the peaks 32 and in a concave relationship at the valleys 34. A first outwardly sloping edge portion of each pair is denoted by the letter H, while the second edge portion of each pair is denoted by the letter L. The designation "H" refers to the fact that edge portion H is at a higher outward angle of slope than portion L, while the designation "L" refers to the fact that edge portion L is at a lower outward angle of slope than portion H. Both edge portions H and L are straight, with edge portion H being at an angle θ of approximately 10° and edge portion L being at an angle Φ of approximately 5°. All edge portions H are preferably disposed at the same angle θ, while all edge portions L are preferably disposed at the same angle Φ.

It will be noted that although edge portions L effectively lead inwardly from their intersections with portions H at peaks 32, portions L do not actually slope inwardly relative to longitudinal axis 30. Thus, edges 14 and 16 are at all times diverging from one another along their lengths until head 20 is reached. Even in the region of head 20, just prior to rounded corners 26, 28, edge portions L are presented at angle Φ and intersect with a sharply outwardly angled portion S immediately following the last valley 34f. Such sharply angled edge portion S produces an enlarged width for head 20 compared to the remainder of body 12.

Preferably, the edge portions H and L are all straight and flat. However, it is also within the scope of the present invention that such edge portions could be arcuate. Similarly, although the intersections between edge portions H and L define precise points, such intersections could be more blended so as present rounded surfaces at such intersections.

It will be noted that tip 18 starts with a pair of the lower sloping edge portions L, rather than the higher angled edge portions H. Moreover, the edge portions L in tip 18 are the longest such portions over the entire length of wedge 10. Consequently, tip 18 has a pronounced, slender protruding presence, particularly as compared to prior art wedges with have sloping sides in the area of a 6° slope. This long, slender configuration for tip 18 facilitates insertion of wedge 10 into a slot during use, i.e., it provides a "quick start."

The tip 18 comprises the first of three major sections of body 12 and may for convenience be identified by Roman numeral I. A second section of body 12 may be identified by Roman numeral II and includes an area containing the first high angled edge portions H and the next lower angled edge portions L. Edge portions H and L in section II are both shorter than edge portions L in section I and are approximately equal to one another in length.

A third and final section of body 12 may be identified by Roman number III and includes an area stretching from valleys 34b to end surface 24 of head 20. All of the edge portions H and L in section III are substantially shorter than the edge portions H and L in section II. However, whereas there is only one edge portion L in each edge 14, 16 of section I, and there are two edge portions H and L in each edge 14, 16 in section II, there are many edge portions H and L in each edge 14, 16 of section III. It will be seen that wedge 10 in effect combines three different wedges in one, i.e., the wedge presented by section I, the wedge presented by section II, and the wedge presented by section III.

Figure 4:
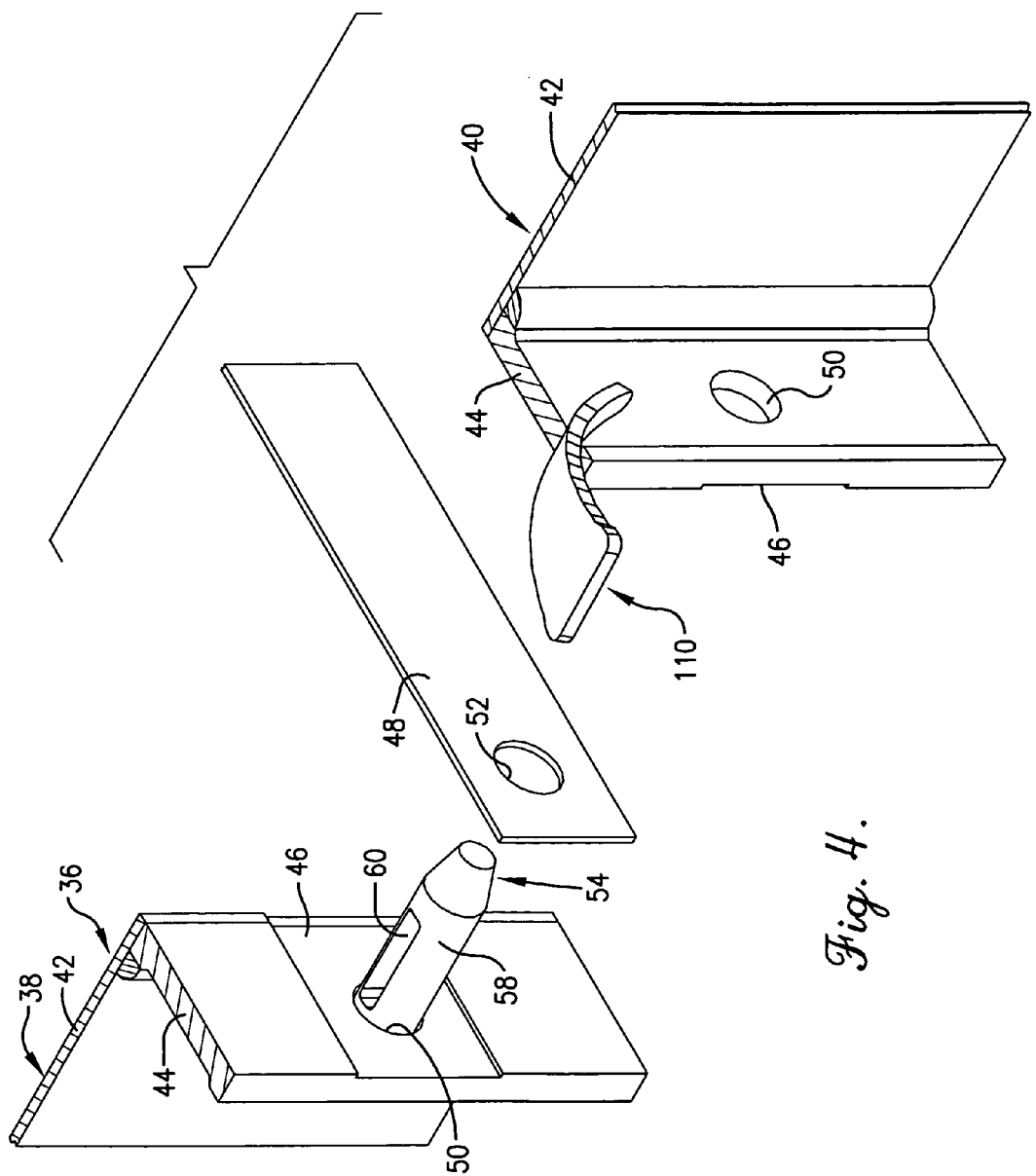
FIG. 4 is a fragmentary, exploded isometric view of portions of a pair of adjacent forming panels illustrating hardware parts used in fastening the two panels together.
Figure 5:
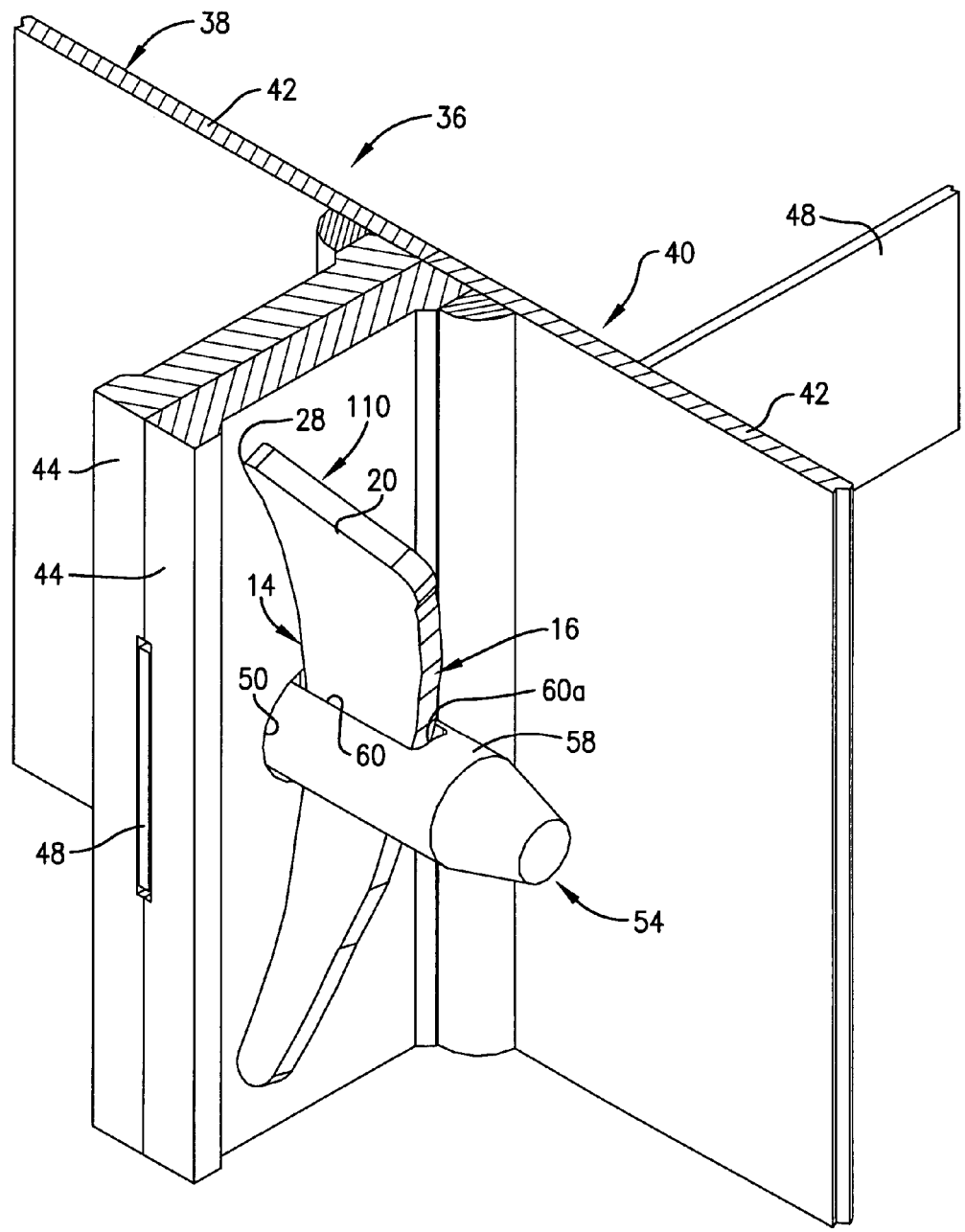
FIG. 5 is a slightly enlarged isometric view of the panels and hardware of FIG. 4 and shown in a fully assembled condition.
Figure 6:
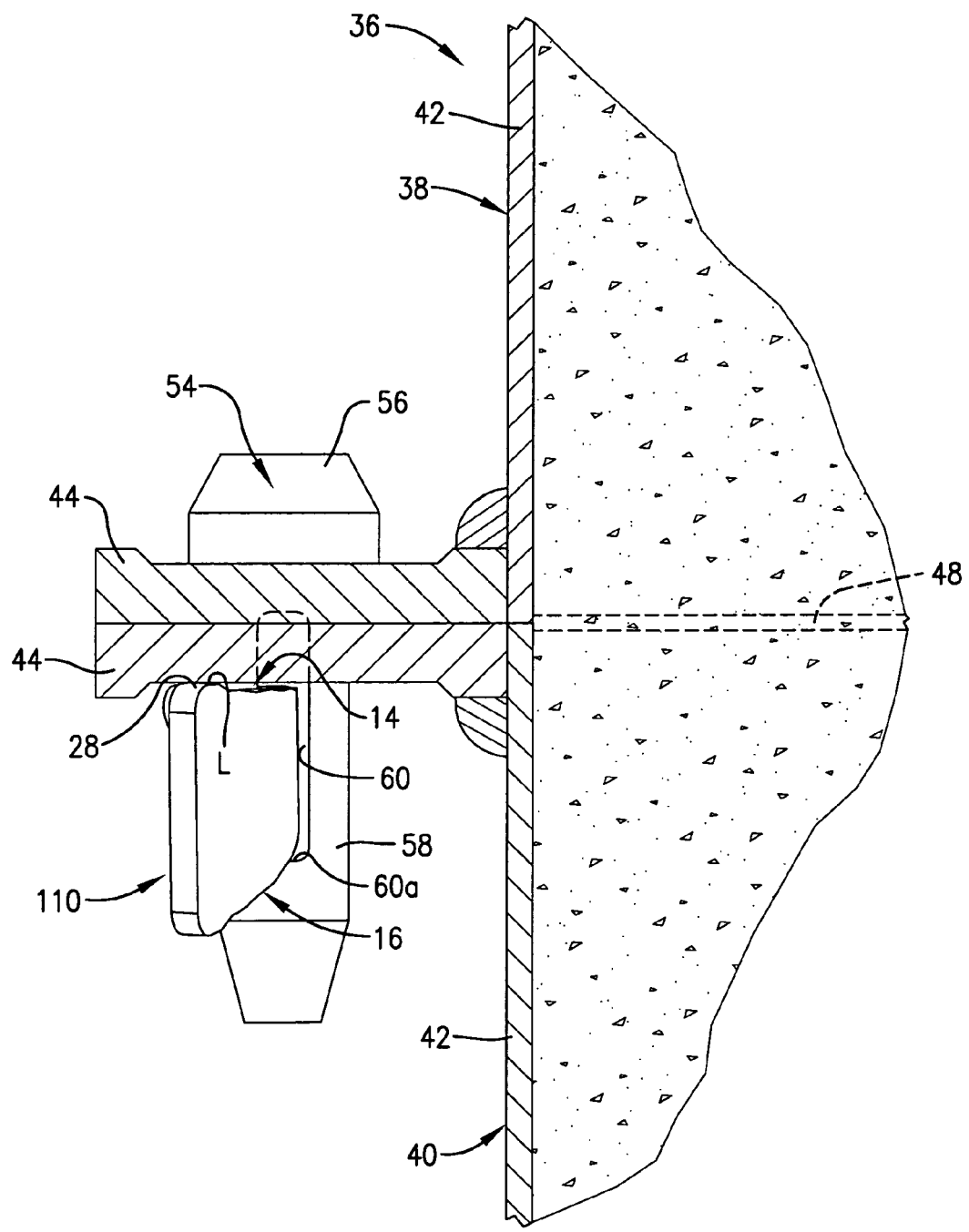
FIG. 6 is a fragmentary, top, horizontal cross-sectional view through the assembled and retained panels.

FIGS. 4, 5, and 6 illustrate how a wedge in accordance with the present invention is utilized in connection with a concrete form. Although a curved wedge 110 has been selected for illustration, it will be understood that the same principles of use apply to the flat wedge 10.

As shown in these figures, a concrete form broadly denoted by the numeral 36 is fragmentarily illustrated and includes a pair of panels 38 and 40. Each panel 38, 40 has a face plate 42 and a rail or other frame member 44 fixed to plate 42 and projecting rearwardly therefrom along a side extremity of plate 42. Rails 44 may or may not be provided with notches 46 that allow a tie bar 48 to be clamped in place between rails 44 of adjacent panels 38, 40 without causing a significant gap therebetween as illustrated in FIG. 5. Other panels (not shown) may be placed in spaced opposition to panels 38 and 40 so as to define an area in which the concrete is to be poured. Tie bar 48 may be used to interconnect the opposed panels to provide a rigid structure and to strengthen the concrete.

The rails 44 are each provided with a hole 50, and tie bar 48 is correspondingly provided with a hole 52. When holes 50 and 52 are aligned with one another, a retaining pin 54 may be inserted into and through such holes, with the enlarged head 56 of pin 54 bearing against the inboard face of one of the rails 44 and the shank 58 of pin 54 projecting through and beyond the hole 50 of the other panel 40. A transverse slot 60 in shank 58 projects beyond the inboard face of one of the rails 44 to a variable extent, depending upon the thicknesses of the rails 44, i.e., the effective exposed length of slot 60 is greater if rails 44 are thin and smaller if rails 44 are thick.

As illustrated particularly in FIGS. 5 and 6, when wedge 110 is driven down into slot 60, one of the edges 14, 16 bears against the end 60a of slot 60 while the other edge and the rounded corner 26 or 28 of head 20 engage proximal inboard surface portions of rail 44 on panel 40. Thus, as wedge 110 is driven progressively deeper into slot 60, it becomes progressively wedged tighter and tighter between rail 44 and the end 60a of slot 60, simultaneously causing both rails 44 to be progressively drawn together by the action of head 56 of pin 54 pulling against the inboard face of the rail 44 associated with panel 38.

The valleys 34 along edge 16 serve much like detents as wedge 110 is driven into place. The end 60a of slot 60 tends to become seated within first one of such detents as wedge 110 is driven into place and then another as the wedge is further driven home. In an action somewhat resembling that of a ratcheting action, the wedge is gripped at each detent or valley in turn as the wedge is driven home until, finally, the desired full extent of insertion is achieved. In this condition, the wedge is tightly gripped and resists loosening due to the inclined nature of the edge portion adjacent the particular valley engaged by the end 60a of slot 60.

Notwithstanding the firm gripping action, the wedge 110 can be readily removed from pin 54 by appropriate impact on the point 22 to drive the wedge upwardly out of slot 60. Such release of the wedge tends to be gradual rather than sudden, again due to the undulating nature of the edges of the wedge. This keeps the wedge from suddenly flying out of the slot 60, reducing loss and promoting safety.

It will also be noted that the wedge 110 is easier to insert than prior wedges and can accommodate a greater variation in the amount of exposed slot in pin 54. The long slender nature of tip 18 within section I encourages the wedge to become quickly centered within even a small amount of exposed slot such as might be present where the side rails 44 are thicker than normal. In this respect, where slot 60 is particularly short, the wedge may be adequately gripped even if only inserted to the extent of the first valley 34a. On the other hand, where slot 60 is longer than average, the wedge may be forcefully gripped when inserted to the extent of the last valley 34f. In most instances, the wedge will be inserted to at least the extent of the second valley 34b.

It should thus be apparent that a wedge constructed in accordance with the principles of the present invention provides a significant advance in the art. The new design provides an enhanced grip, yet allows insertion of the wedge to various depths in the pin slot. It has a narrow width to work in both tight spaces and opened conditions so as to eliminate the need for multiple wedges of different sizes. With rounded corners, there is reduced risks of slicing and less damage to cooperating adjacent surfaces of the metal forms, which is particularly advantageous where the wedges are made out of a harder material than the forms themself. Furthermore, the new design is less likely to spring into the air during stripping of the forms, reducing the possibility of injury and lost wedges. Finally, but just as importantly, the new wedge has been shown to set faster and easier than prior wedges.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. A retaining wedge comprising
   an elongated, tapered body having a longitudinal axis and a pair of diverging side edges, at least one of said side edges having depressions therein to facilitate gripping of the wedge by an edge of a slot within which the wedge is disposed,
   said body having a head and a tip at opposite ends of the body,
   said body being wider at the head than the tip,
   said at least one side edge having multiple pairs of successive first and second edge portions that slope outwardly relative to said longitudinal axis as each edge portion progresses in a direction toward the head of the body away from the tip, with each first and second edge portion extending from the outermost end of the preceding first and second edge portion.
   each first edge portion sloping outwardly at a first angle and each second edge portion sloping outwardly at a second angle that is less than the first angle.

2. A retaining wedge as claimed in claim 1, both of said side edges having at least one depression therein.

3. A retaining wedge as claimed in claim 2,
   both of said side edges having a plurality of depressions therein at spaced locations along the length of the side edges.

4. A retaining wedge as claimed in claim 3,
   each of said side edges having a series of alternating peaks and valleys along the length thereof,
   said valleys presenting said depressions.

5. A retaining wedge as claimed in claim 4,
   each of said side edges having multiple pairs of successive first and second edge portions that slope outwardly as said head is approached,
   each first edge portion sloping outwardly at a first angle and each second edge portion sloping outwardly at a second angle that is less than the first angle,
   said peaks being defined by convex intersections between first and second edge portions and said valleys being defined by concave intersections between second and first edge portions.

6. A retaining wedge as claimed in claim 5,
   said first angle being substantially the same for all of said first edge portions.

7. A retaining wedge as claimed in claim 6,
   said second angle being substantially the same for all of said second portions.

8. A retaining wedge as claimed in claim 5,
   said second angle being substantially the same for all of said second portions.

9. A retaining wedge as claimed in claim 1,
   said body being constructed from plate material to present a uniform thickness throughout its length.

10. A retaining wedge as claimed in claim 9, said body being flat.

11. A retaining wedge as claimed in claim 9, said body being curved.

12. A retaining wedge as claimed in claim 1,
    said tip having a rounded point.

13. A retaining wedge as claimed in claim 12,
    said head having a pair of rounded corners.

14. A retaining wedge as claimed in claim 1,
    said tip having at least one outwardly sloping edge portion that is longer than any of the other edge portions of the body.

15. A retaining wedge as claimed in claim 1,
    said side edges including side edge portions of said tip that diverge from one another as said head is approached,
    said side edges further including side edge portions leading away from said side edge portions of said tip toward said head and diverging from one another at a greater rate of divergence than the side edge portions of said tip.

16. A retaining wedge as claimed in claim 1,
    each of said side edges having a series of alternating peaks and valleys along the length thereof,
    said valleys presenting said depressions,
    said peaks being defined by convex intersections between first and second edge portions and said valleys being defined by concave intersections between second and first edge portions,
    said body including a tip section having no peaks.

17. A retaining wedge as claimed in claim 16,
    said body having a second section adjacent said tip section,
    there being a valley between said tip section and the second section.

18. A retaining wedge as claimed in claim 17,
    said second section having a single peak in each side edge thereof.

19. A retaining wedge as claimed in claim 18,
said body further including a third section adjacent said second section and having a plurality of peaks in each side edge thereof.

20. A retaining wedge as claimed in claim 19,
there being a valley between said second section and said third section.

21. A retaining wedge as claimed in claim 1,
said at least one side edge having a series of alternating peaks and valleys along the length thereof,
said valleys presenting a plurality of said depressions,
said peaks being defined by convex intersections between first and second edge portions and said valleys being defined by concave intersections between second and first edge portions.

22. A retaining wedge comprising an elongated, tapered body having a pair of diverging side edges, at least one of said side edges having at least one depression therein to facilitate gripping of the wedge by an edge of a slot within which the wedge is disposed,
both of said side edges having at least one depression therein,
both of said side edges having a plurality of depressions therein at spaced locations along the length of the side edges,
each of said side edges having a series of alternating peaks and valleys along the length thereof,
said valleys presenting said depressions,
said body having a head and a tip at opposite ends of the body,
said body being wider at the head than the tip,
each of said side edges having multiple pairs of successive first and second edge portions that slope outwardly as said head is approached,
each first edge portion sloping outwardly at a first angle and each second edge portion sloping outwardly at a second angle that is less than the first angle,
said peaks being defined by convex intersections between first and second edge portions and
said valleys being defined by concave intersections between second and first edge portions,
said second angle being substantially the same for all of said second portions,
said tip having outwardly sloping edge portions disposed at the same angle as said second edge portions,
said sloping edge portions of said tip being longer than any of the other edge portions of the body.

23. A retaining wedge comprising
an elongated, tapered body having a pair of diverging side edges, at least one of said side edges having at least one depression therein to facilitate gripping of the wedge by an edge of a slot within which the wedge is disposed,
said body having a head and a tip at opposite ends of the body,
said body being wider at the head than the tip,
at least one of said side edges having multiple pairs of successive first and second edge portions that slope outwardly as said head is approached,
each first edge portion sloping outwardly at a first angle and each second edge portion sloping outwardly at a second angle that is less than the first angle,
said tip having at least one outwardly sloping edge portion that is longer than any of the other
edge portions of the body,
said sloping edge portion of the tip being disposed at the same angle as said second edge portions.

* * * * *